D. C. LOCKWOOD.
DIES FOR MOLDING PLASTIC MATERIAL.
No. 194,920. Patented Sept. 4, 1877.
FIG. 1. FIG. 2.
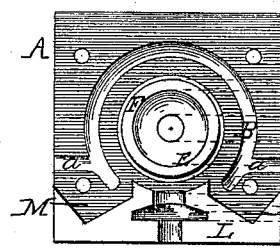 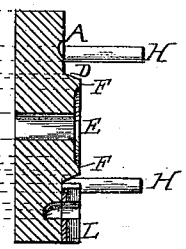
FIG. 3. FIG. 4.
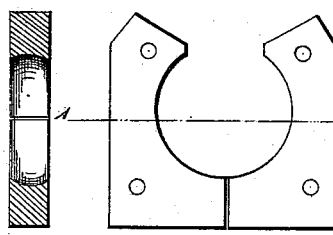 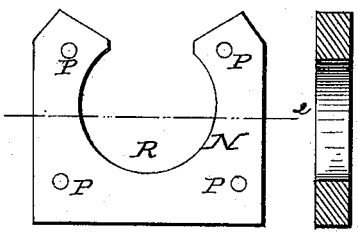
FIG. 5. FIG. 6.
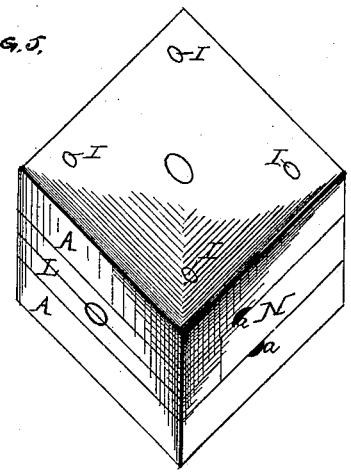 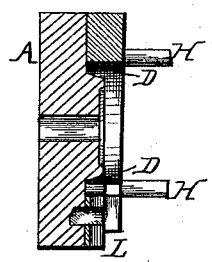
WITNESSES;
F. Walter Fowler.
Chas. Gill.
INVENTOR;
David C. Lockwood
By his attys.
Cox and Cox.

UNITED STATES PATENT OFFICE.

DAVID C. LOCKWOOD, OF NEWARK, NEW JERSEY, ASSIGNOR TO THE CELLULOID HARNESS TRIMMING COMPANY, OF SAME PLACE.

IMPROVEMENT IN DIES FOR MOLDING PLASTIC MATERIAL.

Specification forming part of Letters Patent No. 194,920, dated September 4, 1877; application filed July 31, 1877.

*To all whom it may concern:*

Be it known that I, DAVID C. LOCKWOOD, of Newark, in the county of Essex and State of New Jersey, have invented a new and useful Improvement in Dies, of which the following is a specification, reference being had to the accompanying drawings.

The invention relates to an improved die; and consists of two or more face-plates provided with corresponding cavities and elevations and guides to insure the proper relation when the plates are operated. Between these plates is interposed an anvil formed in one or more pieces, and having a central aperture, the edges of which are coincident with the exterior edges or circumference of the outer forming space or cavity in the face-plates.

The object of the invention is to provide a die capable of producing by pressure a structure which shall exhibit no band, seam, or excrescence upon its exterior surface or surfaces.

The die may be constructed of steel or any other suitable material.

Figure 1 is a plan view of one of the face-plates. Fig. 2 is a central vertical longitudinal section of same. Figs. 3 and 4 are plan views of the anvils, with detached sections of same, through the line 1 2, Fig. 3, exhibiting an anvil made in two parts, and having a concave surface on its inner edge; and Fig. 4, an anvil having a vertical surface on said edge, and constructed in one piece. Fig. 5 is a perspective view of the complete die. Fig. 6 is a central vertical longitudinal section of one of the face-plates, with the anvil in position.

The accompanying drawings exhibit the invention as embraced in a die for forming a harness-terret either out of any plastic or malleable material, or of pressing plastic material upon a terret of such dimensions that both it and the coating can be introduced into the forming-spaces of the die.

In the drawings, A represents the face-plates, each provided with an exterior annular or other suitably-formed recess or cavity, B, which may, if desired, be supplied with the outlets *a*, the purpose of these outlets and cavities being to receive and permit the escape of any surplus matter expelled in the operation.

Within the annulus B, and entirely encompassing the central parts of the face-plate, is provided the annular space D, the surface of which may be plain, as in the present instance, or concave, convex, embossed, or recessed in any manner, so as to produce in obverse or reverse the representation of any appearance, figure, or ornamentation. It also serves as a table whereon may be placed any matter or matters which it is desired to incorporate into the material being operated upon, for the purpose of ornamenting or strengthening the article formed by the die, as, for instance, gold-dust, paint, or rings of metal.

Within the annular space D is provided the raised boss E, the outer surface of which is of such shape as to prevent the article, when formed, being bound or confined on the boss when the pressure is relieved. The upper surface F of the boss is flat, and its center is depressed to an aperture to receive and permit the escape of waste material. The bosses E are of such height that when the face-plates are forced together the surfaces F shall closely impinge. The face-plates are exact counterparts of each other, and one or both are provided with a guide or guides and aperture or apertures, so as to direct the plates, when approaching, in such manner that the several forming features in each shall be exactly opposite each other. In the present instance this is accomplished by the guide-studs H and apertures I.

On one side of each face-plate a platform, L, is raised above the surface of the space D a distance equal to one-half the thickness of the anvil, hereinafter mentioned. Each platform is provided at the proper place with a corresponding depression or recess, to accurately receive the base or stem of the terret to be coated. Those parts of the platform opposite the boss E form a continuation of the formation upon the adjacent sides of the aperture in the anvil.

At each side of each platform is provided the angular cavity M, to receive the angular ends of the anvil and assist in holding it in place; but it is plain that one or more platforms may be provided and placed at different parts of the plate A, and furnished with recesses of suitable dimensions to receive studs of corresponding superficies upon the anvil, so that the same may be held in place at several points. The upper surface of the platform L and boss E are in the same horizontal plane.

As at present presented, the anvil N is formed of one piece of material, in thickness being double the elevation of the platform L, and is provided with the apertures P, through which pass the guide-studs H. The anvil has its extremities formed so as to accurately enter the cavities M in the platform, by which means, in conjunction with the guide-studs H, the anvil is held in place; but it is plain that many other expedients of an analogous order may be resorted to to keep the anvil in proper position. Thus the edges of one or both of the face-plates may be carried up on two or more sides, and the anvil provided with suitable recesses to receive such raised parts, which would operate as a frame holding the anvil.

The interior of the anvil is occupied by the opening or aperture R, the sides of which are vertical, and, when the anvil is in place, at right angles to the surface D on the face-plates. One side of the anvil is cut away and properly conformed to receive the projecting parts of the platform which receive the terret-stem, those parts of the platform opposite the boss E forming a continuation of the surface of the aperture of the anvil R.

In the present instance the anvil is made in one piece, and such is the preferable construction where the die is to be employed to form articles the exterior superficies of which are flat; but when employed to form concave, convex, ornamental, or embossed surfaces, the anvil N is divided vertically into two or more sections, the inner surfaces of which are conformed as desired, and when the sections are in place said surfaces are continuous. These sections may be secured in place by means of studs and recesses, or guides and apertures, as above set forth.

This construction is required, for the reason that the article, when formed, unless flat on its outer surface, could not be removed after such surface was pressed into the walls of the aperture R.

The parts, when in contact, impinge upon the surfaces of the platforms, the bosses, and the anvil, which impact prevents the crushing of the article being formed by the excessive descent of the motor face-plate.

In the formation of articles to be configured on their inner surfaces the boss E is suitably formed, and when articles circular or other than straight-sided in section are to be pressed, the space D must be conformed so as to constitute an extension of the adjacent faces of the boss and anvil.

Operation: If a terret having a flat exterior surface is to be pressed, the rough blank is placed in the recess of the lower face-plate and the anvil, and the upper face-place is then crowded down. This forces the material or coating into the recesses, and causes the exterior to assume a surface the same or the obverse of the inner walls of the anvil and die, the surplus material being expelled in a thin film outward between the anvil and face-plates, and inward between the surfaces F of the bosses E. The article is then dried, removed from the die, and the films, which occur only on the upper and lower corners or parts thereof, are broken off, and their edges, whence the films are removed, smoothed and polished in any desired manner.

If a structure having other than a plain exterior surface is to be formed, the anvil, divided into sections, as aforesaid, is secured in position, and the rough blank placed in the recesses, and the operation aforesaid performed. The pressed article is removed by raising the anvil clear of its guides and means of retention, and separating the sections thereof.

The die being heated, a polish may be imparted to the article subjected to the pressure.

It is plain that the above operations may be performed with equal success whether a solid blank or one coated with plastic or malleable material be operated upon, as the formation of surfaces is the result sought.

In forming rings or other structures having vertical surfaces, and no stem or analogous attachment, the anvil has no break in the walls of its aperture, but is continuous, and that part of the platform containing the recesses to receive the terret-stem is omitted or made plain, the platform being so disposed as to afford a proper resistance to the face-plates, to permit the location of the said anvil and to secure it in place.

If structures are to be formed having curved or irregular surfaces, the anvil is arranged in sections to encompass the blank, the construction and arrangement of the parts being otherwise as last above described.

What I claim as my invention, and desire to secure by Letters Patent, is—

1. A die the parts of which being closed the material operated upon is forced outward against a surface or surfaces having no seam or joint between the upper and lower edges thereof, substantially as set forth.

2. A die consisting of two or more face-plates and an anvil, the latter having a vertical inner surface, substantially as set forth.

3. A die consisting of two or more face-plates and an anvil, divided into sections, which are conformed, as desired, upon those surfaces with which the material pressed comes in contact, substantially as set forth.

4. In a die, a removable anvil to receive the impact of the motor-plate, substantially as set forth.

5. In a die, a solid removable anvil having a vertical inner surface, substantially as set forth.

6. In a die, a removable anvil made in sections, substantially as set forth.

7. In a die, a removable anvil made in sections, having vertical inner surfaces, as set forth.

8. In a die, a removable anvil made in sections, the surfaces of which against which the material is pressed being curved or irregular, substantially as set forth.

9. The boss E, in combination with the anvil N, substantially as set forth.

10. The face-plates A, in combination with the anvil N, formed in one or more parts, substantially as set forth.

11. The recesses B and annular space D, in combination with a solid or sectional anvil, as set forth.

12. A raised stud or platform, for the purpose of securing the anvil in place, as set forth.

13. The method of forming or producing articles having no horizontal excrescence or protuberance on their outer surface, which consists in causing the pressure of material against a surface or surfaces solid between the upper and lower edges thereof, substantially as set forth.

In testimony that I claim the foregoing improvement in dies, as above described, I have hereunto set my hand this 16th day of July, 1877.

DAVID C. LOCKWOOD.

Witnesses:
WM. McMURTRY,
ANDREW J. MATTISON.